United States Patent [19]

Lin et al.

[11] 4,373,837
[45] Feb. 15, 1983

[54] PIER WITH PRESTRESSED RESILIANT INTEGRAL DECK TO ABSORB DOCKING FORCES OF SHIPS

[75] Inventors: Tung-Yen Lin, El Cerrito; Philip Y. Chow, Orinda, both of Calif.

[73] Assignee: T. Y. Lin International, San Francisco, Calif.

[21] Appl. No.: 267,708

[22] Filed: May 28, 1981

[51] Int. Cl.³ .............................................. B63C 1/00
[52] U.S. Cl. ................................... 405/218; 52/263;
52/223 R; 52/231; 14/73
[58] Field of Search ............... 405/218, 211, 212, 214,
405/215; 114/219, 230, 231; 267/140; 52/223,
226, 231, 230, 263; 14/73, 75

[56] References Cited

U.S. PATENT DOCUMENTS

| | | | |
|---|---|---|---|
| 438,070 | 10/1890 | Eddy | 14/73 |
| 510,064 | 12/1893 | Eddy | 14/73 |
| 1,095,202 | 5/1914 | Friend | 14/73 |
| 1,227,670 | 4/1917 | Ripley | 405/218 |
| 1,616,480 | 2/1927 | Zimmerman | 14/73 |
| 2,426,477 | 8/1947 | Walton | 405/218 |
| 2,813,310 | 11/1957 | Harrison | 52/263 X |
| 3,286,421 | 11/1966 | Branstrator | 52/263 X |
| 3,794,433 | 2/1974 | Schupack | 14/73 X |
| 3,903,667 | 9/1975 | Zetlin | 52/263 X |

*Primary Examiner*—Nile C. Byers, Jr.
*Attorney, Agent, or Firm*—Owen, Wickersham & Erickson

[57] ABSTRACT

In a pier having a series of spaced-apart horizontal pile caps surmounting and connecting the supporting piles together transversely of said pier, there is an integrated one-piece deck supported atop the pile caps so that it can slide thereon. A series of prestressing tendons connect the deck to the pile caps so that when a wharf is struck by a ship, the lengthening and shortening of the tendons and the sliding friction between the deck and the pile caps absorbs the impact load.

11 Claims, 11 Drawing Figures

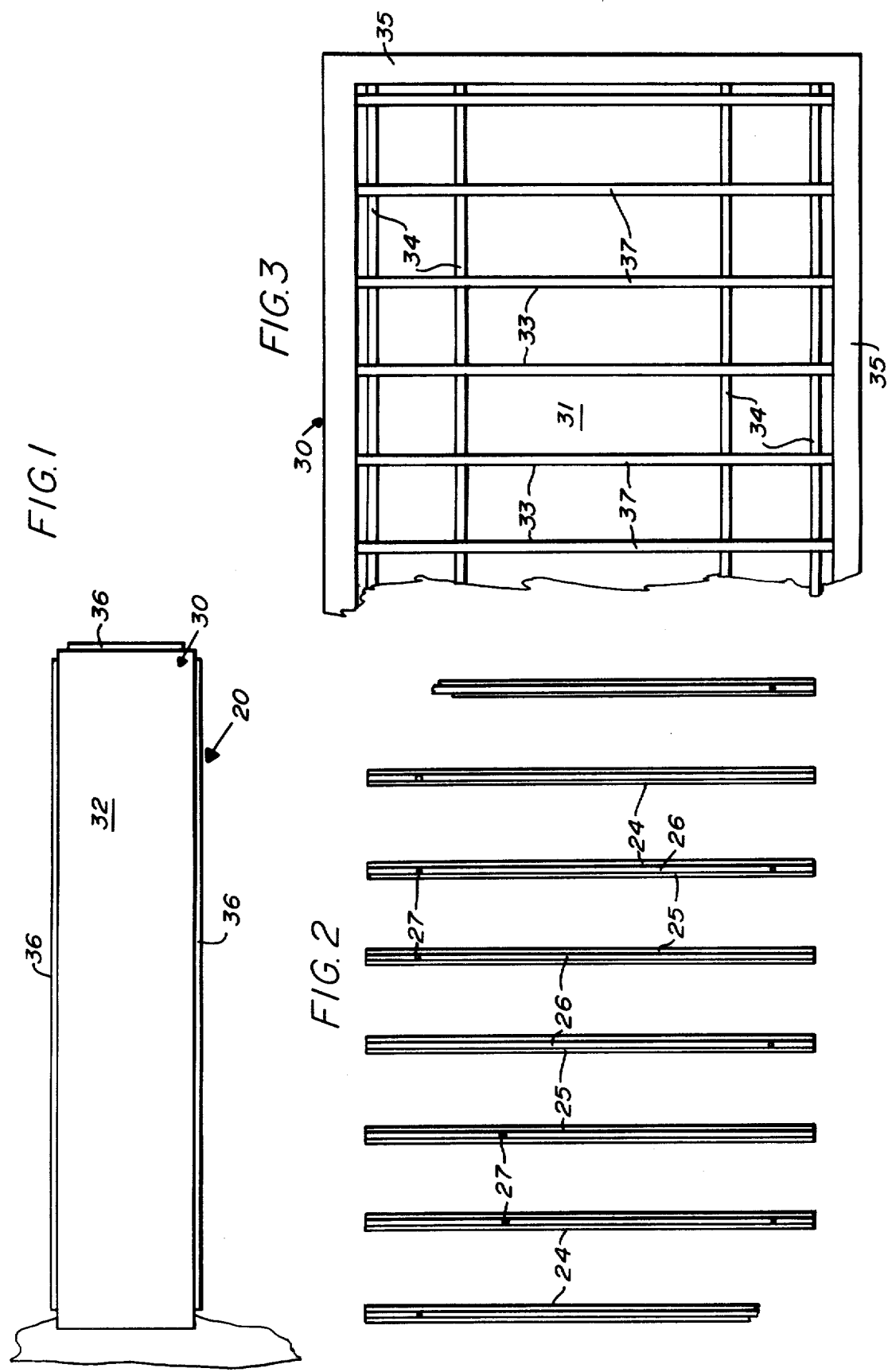

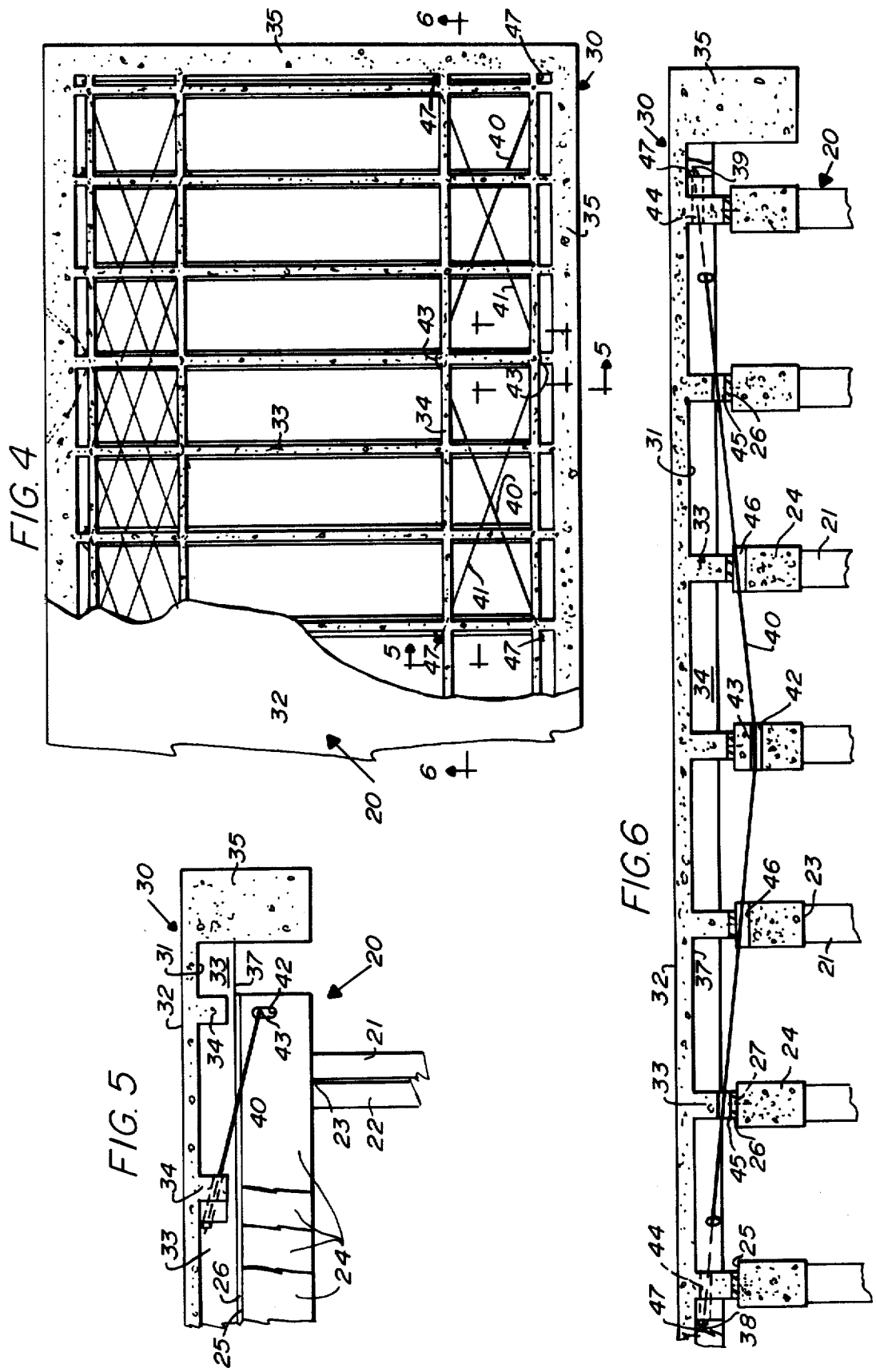

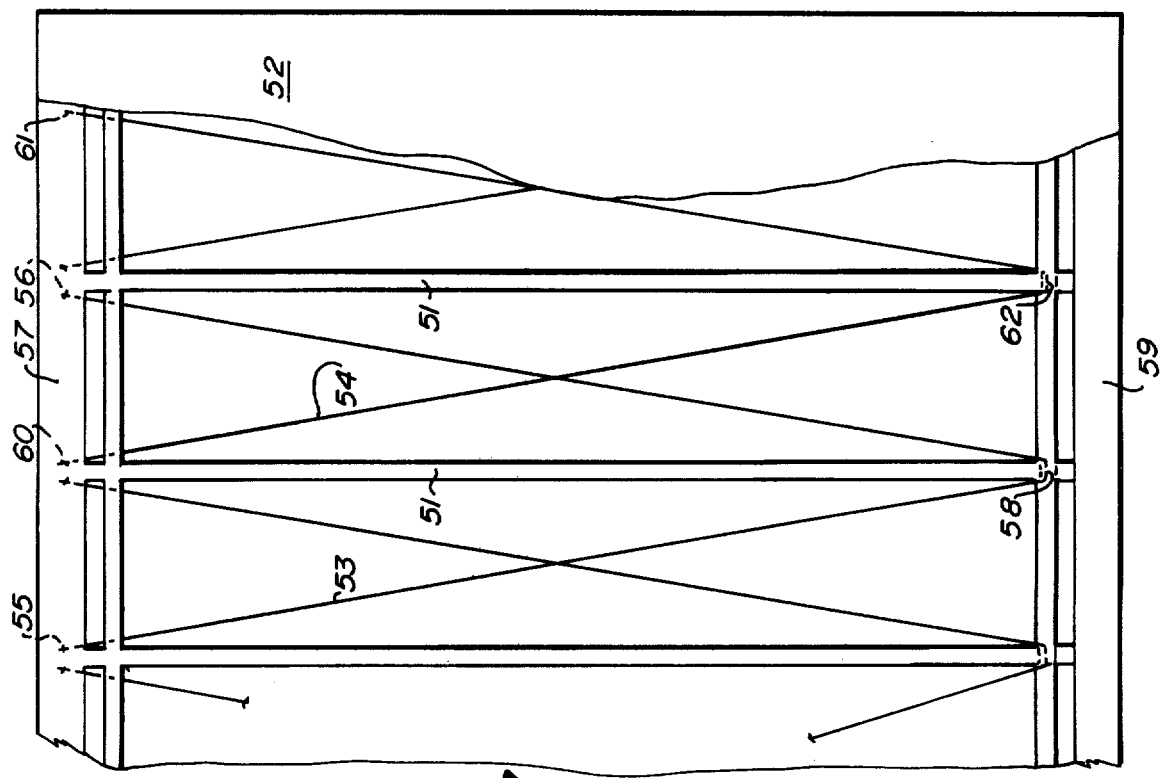
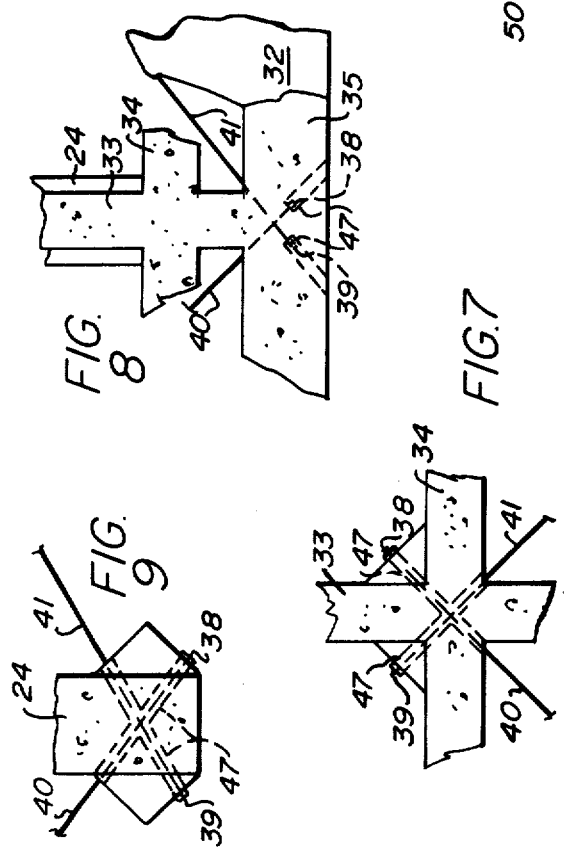
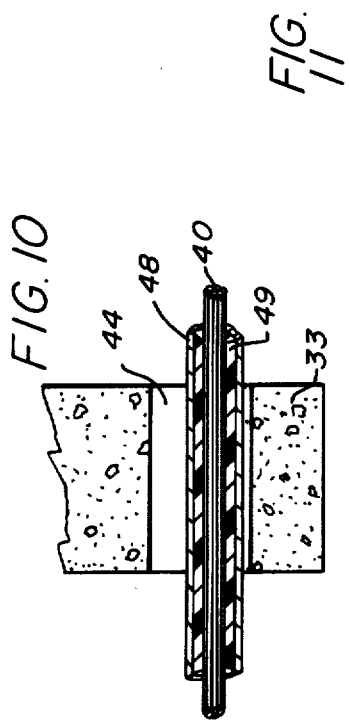

PIER WITH PRESTRESSED RESILIANT INTEGRAL DECK TO ABSORB DOCKING FORCES OF SHIPS

This invention relates to an improved pier having a one-piece, integrated wharf deck which is connected to the supporting pier bents by post-tensioned tendons. As a result, the energy of approaching ships being docked can be absorbed by virtue of the internal work performed by the elongation and shortening of the prestressed tendons.

BACKGROUND OF THE INVENTION

A conventional wharf deck depends on timber and rubber fenders and flexible piles to absorb impact energy. These are often damaged and worn out in the course of time and have to be replaced, thus becoming difficult and expensive to maintain.

SUMMARY OF THE INVENTION

This deck of this invention absorbs part of the docking energy by distributing it to a number of pier bents, which are substantially fixed and are relatively unyielding. The distribution is done through prestressed, i.e., post-tensioned, tendons that are anchored to both the wharf deck and the pier bents. The post-tensioned tendons (which may be made of steel wires, bars, or strings), are elongated or shortened as the deck is moved sideways by the docking force of the ships. Both the elongation and shortening of these tendons perform internal work which (together with the frictional resistance at the sliding surface between the deck and the pier bents) absorb the major part or all of the impact loads produced by the moving ships as they are moored to the deck.

These elongated cables and the pier bents all act within their elastic limit, so that they essentially regain their original position after having absorbed the energy imparted to them by the mooring ships. An adequate factor of safety insures proper behavior, as in most engineering designs.

The wharf deck is integrated into one piece by any of various means, such as, by reinforcing it with steel rods, by prestressing it, or by welding and riveting of steel members and joints, so that the entire deck (of concrete or other suitable material) is integrated into one piece, (which may, for example, be about 100 feet wide and several hundred feet long). The wharf deck itself then acts as a horizontal diaphragm in the lateral (or transverse) direction and helps to distribute the mooring force to the majority of the bents supporting that wharf. The responses of the various bents to a mooring ship can be predicted and analyzed by basic mechanics and computer programs in order to determine the distribution of the dock force among the different bents.

The entire deck is slidably mounted on top of the pile caps within limits imposed by the thickened edge of the pier, a sliding surface such as metal bearing plates being provided to minimize the friction between them and to provide a durable wearing surface. However, this frictional loss, as stated above, also helps in the absorption of energy. Since the frictional force may act in opposite directions, when the deck is moved laterally in one direction, frictional force may prevent it from returning to the exact original position. This change in position is small and can be predicted for a particular case. Later bumps against the opposite edge of the deck may restore it to or toward its original position; if not, when its limited permissible movement is achieved, the deck moves no farther.

The main energy absorption is provided by the prestressing tendons, which are arranged in a suitable pattern, preferably a diagonal pattern, crisscrossing along the bottom of the deck or thereabout. The layouts and patterns of these tendons may differ for different cases and can be designed so that the tendons move within predicted limits. Some tendons are lengthened as a result of the mooring ships, while others are shortened thereby. In both cases, internal energy is absorbed by these tendons.

In addition, certain small lateral movements of the supporting bents (which later spring back) also help to absorb the impact of energy of the mooring ships. These of course, have to be calculated for each case.

The proper distribution of impact force by the concrete deck acting transversely depends on frictional forces between the deck and the bents, the lengthening and shortening of the tendons, and the lateral movements of each supporting pier bent.

The tendons are protected and anchored to the wharf deck in a properly designed fashion. They are connected to or looped around verious pier bents at proper locations. The force created at such a point of turning is resisted by metallic or other sleeves. The tendons themselves are protected by plastic, steel, or other tubing, which is greased or grouted with plastic material inside to provide the necessary protection to the cables.

The basic economy of this particular invention is due not only to the basic layout and design of the structure, but also to the extreme economy of highly stressed steel tendons acting in tension, as compared to conventional structure, thereby providing elastic movement of significant magnitude under large prestressing forces, so that a large internal work is done by these tendons.

Many details are involved, such as the proper location and the placement of these tendons, the openings provided through the deck for the passage of the tendons, the anchorage to be provided for the tendons, the protection of the tendons, etc. All these require judgment, investigation with proper experimental and theoretical values to be determined, and consideration of the special conditions of each site.

Other objects, advantages, and features of the invention will appear from the following description.

BRIEF DESCRIPTION OF THE DRAWINGS

FIG. 1 is a top plan view of a pier embodying the principles of the invention.

FIG. 2 is an enlarged fragmentary view of a portion of the supporting bents or pile caps of the pier of FIG. 1.

FIG. 3 is a fragmentary bottom view on the scale of FIG. 2 of a portion of the top deck of the pier of FIG. 1.

FIG. 4 is a fragmentary view, on the scale of FIGS. 2 and 3, of the pier of FIG. 1, partially broken away and shown in section.

FIG. 5 is a further enlarged fragmentary view in section taken along the line 5—5 in FIG. 4 and with some portions broken away.

FIG. 6 is an enlarged view in section taken along the line 6—6 in FIG. 4.

FIG. 7 is an enlarged fragmentary bottom view of an anchorage location where two post-tensioning tendons are anchored to a longitudinal strut of the deck.

FIG. 8 is a similar view where two tendons are anchored to a thickened marginal portion of the deck.

FIG. 9 is a similar view where two tendons are anchored to a pile cap.

FIG. 10 is a fragmentary view in section of the area in which a tendon passes through an opening through a depending deck beam.

FIG. 11 is a fragmentary top plan view of a portion of a pier embodying an alternate form of the invention.

BRIEF DESCRIPTION OF SOME PREFERRED EMBODIMENTS

The Embodiment of FIGS. 1-6

FIGS. 1 to 6 show a pier 20 supported by a series of piles 21 and 22, which may be driven at an angle (see FIG. 5), as shown, meeting at their upper ends 23, or may be identical and vertical. The upper ends 23 of these piles 21 and 22 are joined by laterally extending horizontal pile caps 23 extending across substantially the width of the pier 20. The pier 20 may, for example, be 100 feet wide and 600 feet long, with the pile caps 24 spaced apart, typically, at twenty-foot intervals, resulting in a total of thirty-one lateral pile caps 24. The pile caps 24 thus serve as bents to support a deck.

All these pile caps 24 may be made from reinforced or prestressed concrete, or they may be made from steel or other suitable materials. They have coplanar upper surfaces 25 and, if made of concrete, the upper surfaces 25 are preferably provided with metal plate 26 thereupon to help lower the friction with the deck and to provide a durable wearing surface. Of course, other materials can be used for the plates 26. The plate 26 may be half-inch steel and may be substantially the same width as the beams 24 to which it is secured at intervals, as by counter sunk bolts 27. The metal plate 26 is corrosion resistant or coated to protect it against corrosion in the marine environment.

These pile caps 24 support an integral deck 30, which is preferably made of concrete. It may be made of prestressed concrete or a reinforced concrete in such a way that the deck 30 is integral and functions as a single large slab. This reinforcing or prestressing is not shown in the drawings, being quite of the conventional types of reinforcing concrete. Two novel features, however, are that the deck 30 itself is not secured in any way to the pile caps 24 and that the deck 30 is, in effect, a single, integral, long slab.

As shown in FIG. 1, the deck 30 has a continuous flat slab 31 with an upper surface 32 and, as shown in FIG. 3, the slab 31 is supported from below by depending lateral beams 33 and longitudinal struts 34. The beams 33 may be spaced apart at twenty-foot intervals, and the struts 34 may be located near each edge and about twenty-feet therefrom. The deck 30 also has depending thickened marginal portions 35 at each side and at its outboard end, extending down to about the bottom of the pile caps 24. The outer edges may be protected by conventional fenders 36, which may be rubber, for example, to prevent chipping away of the concrete. The deck's beams 53 each have a flat lower surface 37 that rests on the steel plates 26.

A very important feature of the invention is the use of prestressing tendons 40 and 41 which are arranged in such a manner as to resist movement of the deck 30 relative to the pile caps 24. For example, one end of a tendon may be anchored to the deck 30 at a strut 34 or at a margin 35 and the other end may be anchored to a pile cap 24. Or, as shown in FIGS. 4, 5, and 6, both ends 42 and 43 of a tendon 40 that describe a vee, the ends being anchored to the same strut 34, with the tendon 40 passing through an opening 42 in a pile cap 24 at a vertex 43 of the vee, to bear on that pile cap 24 at the vertex 43. The tendon 40, in such an example, passes freely through openings 44 or slots 45 in beams 33 and through slots 46 or other openings in either pile caps 24 (see FIGS. 6 and 10).

The prestressing tendons 40 and 41 are anchored by suitable conventional anchors 47, as shown in FIG. 7. FIG. 8 shows anchorage to a thickened marginal portion 35 of the deck 30, while FIG. 9 shows anchorage to a pile cap 24. The tendons 40 and 41 (see FIG. 10) may themselves be enclosed in tubing 48 of plastic, or steel, or other suitable material, which may be either greased or grouted inside with plastic 49 to provide the necessary protective cover to the cables 40 and 41 and to enable them to move relatively to the pile caps 24 or beams 33 through which the conduits 43, 44, 45, 46 are provided.

These tendons 40 and 41 may be arranged in various patterns, such as the one shown in FIG. 4, in which two series of tendon vees are used adjacent each longitudinal edge of the deck 30, with one series of tendons 40 being anchored to the strut 34 closest to the margin 35 and a second series of tendons 41 being anchored to the next strut 34 and the vee vertex 43 in a pile cap 24 very close to the margin 35. Two tendons 40 or 41 may be anchored at or near each such location, as shown in FIGS. 7-9, preferably with some overlap. The tendons 40 going in one basic direction are thus balanced by tendons 41 going in the other basic direction.

These tendons 40 and 41 are brought up to the desired degree of post-tensioning by use of conventional post-tensioning means. Due to the fact that some go in one direction and some go in the other direction, impact against the deck 30 produces different kinds of reaction on them. This criss-crossing of the angles thus provides one good system. Efficiency can be obtained by using four one-half inch diameter strands initially stressed to about 50% of the effective or working prestress. For different sizes and different materials and in different instances different figures would apply, however, these are representative. Each time the tendon 40 or 41 passes through a pile cap 24 if it is free to move, as of course, it is where it simply lies free below the deck 30.

The embodiments of FIG. 11

The form of the invention shown in FIG. 11 comprises a pier 50 with transverse pile caps 51 that are spaced, for example, twenty feet apart. An integral deck 52 is provided as before, Tendons 53 and 54 are disposed in a V shape, with each end 55 and 56 of one set of tendons 53 being anchored to the rim or margin 57 of the deck 52, but extending over to and coming back from a vertex 58 at a pile cap 51 near the opposite deck margin 59. The other set of tendons 54 also has both ends 60 and 61 anchored to the rim 57 and extending to and from a vertex 62 in a pile cap 51 near the opposite side of the deck 52. No openings through the pile caps 51 are needed except at the vertices 58 and 62. Again, the prestressing may be brought up to about 50% of the full amount of which it is capable, meaning that it can be further prestressed under impact. The tendons 53 act in opposite direction to the tendons 54; so the tendons 53 tend to move in one direction when the other tendons 54 tend to move in the other direction, thereby taking up the forces.

Example of Calculations

Assume:
the pier deck is to be 100'×600'—absorbing 50% impact energy $E_i$,
the ship is to weight 30,000 long tons, and
the approach velocity, V=0.75 ft/sec.
Then:

$$E_i = \frac{mv^2}{2} = \frac{30{,}000 \times 2.240 \times 0.75^2}{2 \times 32.2} = 587{,}000 \text{ ft. lbs.}$$

Assume that 50% energy is absorbed by the deck. Thus, $E_i/2 = 293{,}500$ ft. lbs. to be absorbed by the deck.

Now assume that the tendons are to be stressed initially to 25% elongation, and under impact to 5%, i.e., moving a maximum of 3" under load; and assume that the coefficient of friction is 0.1 (static, then sliding, steel on steel). The pile rows are on 20-foot centerlines.

The reaction Rf per pile row due to deadload (at 300 psf)
= 100×20×0.3×0.1 = 60 kips (a negligible amount).

Equating $E_i$ to work done—$E_i/2 = Fd/2 = 293{,}500$ where d is the total lateral deflection of the deck, and F is the lateral force on the deck. (1) distance d=0.25' i.e.:

$$F = \frac{2}{0.25}(293{,}500) = 2{,}348{,}000\# = 46\tfrac{1}{2}"\phi \text{ strands.}$$

(2)=0.5' i.e.:

$$F = \frac{2}{0.5}(293{,}500) = 1{,}174 \text{ kips}/2 \times 12 =$$

$$48 - \phi\tfrac{1}{2}" \text{ or } 24 - \phi\tfrac{1}{2}" \text{ each side.}$$

If the pile system is considered rigid or as reserve for purpose of energy absorption, and, assuming that the impact energy is absorbed by 6 rows of piles over 120'-0" of pier, then F per pile cap is reduced to 17%, or $4\phi\tfrac{1}{2}"$ strands.

To those skilled in the art to which this invention relates, many changes in construction and widely differing embodiments and application of the invention will suggest themselves without departing from the spirit and scope of the invention. The disclosures and the descriptions herein are purely illustrative and are not intended to be in any sense limiting.

We claim:

1. A pier, including in combination:
supporting piles,
a series of spaced-apart horizontal pile caps surmounting and connecting said piles together transversely of said pier,
an integrated one-piece deck supported atop said pile caps so that it can slide thereon, and having exposed wharf edges, and
a series of prestressing tendons slidably connecting said deck to said pile caps,
whereby, when a wharf is struck by a ship, the lengthening and shortening of the tendons and the sliding friction between the deck and the pile caps absorbs the impact loads.

2. The pier of claim 1 wherein said one-piece deck includes a series of depending beams that are aligned with and rest on upper surfaces of the pile caps, said pile cap upper surfaces having metal bearing strips with which said beams are in direct contact.

3. A pier, including in combination:
supporting piles,
horizontal pile caps surmounting and connecting said piles together in transverse rows, said pile caps having upper coplanar surfaces with metal bearing strips thereon,
an integrated one-piece deck with an upper surface and bottom surface having transversely extending beams supported atop said pile caps so that it is slidable on said metal bearing strips, having longitudinal depending struts, and having exposed depending wharf edges, and
a series of prestressing post-tensioned tendons each slidably connecting said deck to said pile caps,
whereby, when a wharf is struck by a ship, the internal work performed by the lengthening and shortening of the tendons and by the sliding friction between the deck and the pile caps absorbs the impact loads.

4. The pier of claim 2 wherein the tendons are post-tensioned to approximately half of that for which the tendons are rated.

5. The pier of claim 3 wherein the tendons are shaped as V's, the tendons having their extremities anchored to a strut and passing through a pile cap at the vertices.

6. The pier of claim 5 wherein the tendons are arranged in two series of V's near each lengthwise deck edge with one series running inwardly from its ends to their vertices and the other series having its vertices near the edge and its anchors inboard thereof.

7. A pier, including in combination:
supporting piles,
a series of spaced-apart horizontal pile caps surmounting and connecting said piles together transversely of said pier,
an integrated one-piece deck supported atop said pile caps so that it can slide thereon, and having exposed wharf edges, and
a series of prestressing tendons, each tendon being anchored to said deck at one end and slidably anchored to one of said pile caps at the other end,
whereby, when a wharf is struck by a ship, the lengthening and shortening of the tendons and the sliding friction between the deck and the pile caps absorbs the impact loads.

8. A pier, including in combination:
supporting piles,
a series of spaced-apart horizontal pile caps surmounting and connecting said piles together transversely of said pier,
an integrated one-piece deck supported atop said pile caps so that it can slide thereon, and having exposed wharf edges, and
a series of prestressing tendons, each tendon describing a vee anchored at both ends to said deck and at its vertex passing through one of said pile caps so that the lengthening and shortening of portions of the tendon help to absorb impact loads on the deck.

9. A pier, including in combination:
supporting piles,
a series of spaced-apart horizontal pile caps surmounting and connecting said piles together transversely of said pier, an integrated one-piece deck supported atop said pile caps so that it can slide thereon, and having exposed wharf edges, and a series of prestressing tendons, each tendon describing a vee anchored at each end to a pile cap and having its vertex passing through a portion of said deck so that the lengthening and shortening of portions of the tendon helps to absorb impact loads on the deck.

10. The pier of any of claims 7, 8, and 9 wherein said one-piece deck includes a series of depending beams that are aligned with and rest on upper surfaces of the pile caps, said pile cap upper surfaces having metal bearing strips with which said beams are in direct contact.

11. The pier of any of claims 7, 8 and 9 wherein the tendons are post-tensioned to approximately half of that for which the tendons are rated.

* * * * *